US006580512B1

(12) United States Patent
Hussey et al.

(10) Patent No.: US 6,580,512 B1
(45) Date of Patent: Jun. 17, 2003

(54) METHOD OF PRODUCING AN OPTICAL FIBRE RESONANT CAVITY, IN PARTICULAR FOR AN INTERFEROMETRIC SENSOR, AND OPTICAL FIBRE RESONANT CAVITY PRODUCED THEREBY

(75) Inventors: Conleth D. Hussey, Limerick (IE); Robert P. Kenny, Gavirate (IT); John T. Sheridan, Dublin (IE); Alfredo C. Lucia, Osmate (IT)

(73) Assignee: European Atomic Energy Community (Euratom), Luxembourg (LU)

( * ) Notice: Subject to any disclaimer, the term of this patent is extended or adjusted under 35 U.S.C. 154(b) by 0 days.

(21) Appl. No.: 09/463,548

(22) PCT Filed: Jul. 20, 1998

(86) PCT No.: PCT/EP98/04532
§ 371 (c)(1),
(2), (4) Date: Oct. 25, 2000

(87) PCT Pub. No.: WO99/05551
PCT Pub. Date: Feb. 4, 1999

(30) Foreign Application Priority Data

Jul. 21, 1997 (EP) .............................................. 97830374

(51) Int. Cl.⁷ .............................. G01B 9/02; H01S 3/067
(52) U.S. Cl. .......................... 356/480; 385/43; 385/42; 372/6

(58) Field of Search ................................. 356/480, 477; 372/6, 107; 385/42–43

(56) References Cited

U.S. PATENT DOCUMENTS

| | | | | |
|---|---|---|---|---|
| 4,052,120 A | * | 10/1977 | Sick et al. | 385/33 |
| 4,315,666 A | * | 2/1982 | Hicks, Jr. | 385/30 |
| 4,720,160 A | * | 1/1988 | Hicks, Jr. | 385/31 |
| 4,758,087 A | * | 7/1988 | Hicks, Jr. | 356/480 |
| 4,923,273 A | * | 5/1990 | Taylor | 385/48 |
| 5,451,772 A | * | 9/1995 | Narendran | 250/227.19 |
| 5,528,367 A | * | 6/1996 | Putnam et al. | 356/480 |

* cited by examiner

Primary Examiner—Robert H. Kim
Assistant Examiner—Krystyna Suchecki
(74) Attorney, Agent, or Firm—Frost Brown Todd LLC

(57) ABSTRACT

To form an optical element (20), in particular an interferometric sensor, an optical fiber (1) is placed tangent to a cylindrical supporting element (2); a straight portion (1a) of the optical fiber and the supporting element are surface fused; and a cavity (26) is formed in the optical fiber (1), the cavity being defined by facing surfaces (27,28) of the straight portion (1a) substantially perpendicular to the axis of the straight portion (1a). The optical fiber (1) and supporting element (2) may be subjected to traction during surface fusion, to form a small cross-section portion close to the cavity, and which, when light is conducted by the optical element, provides for reducing the amount of light dispersed in the cavity.

18 Claims, 2 Drawing Sheets

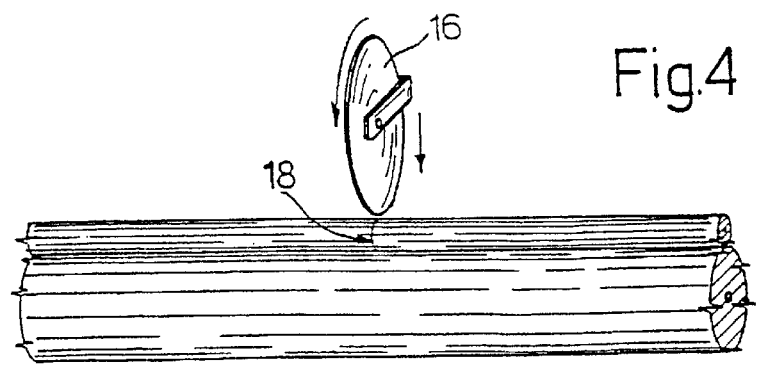
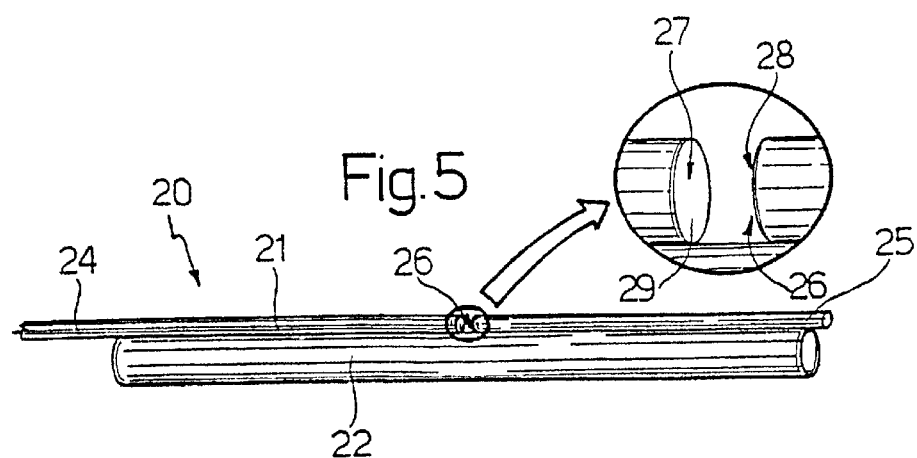
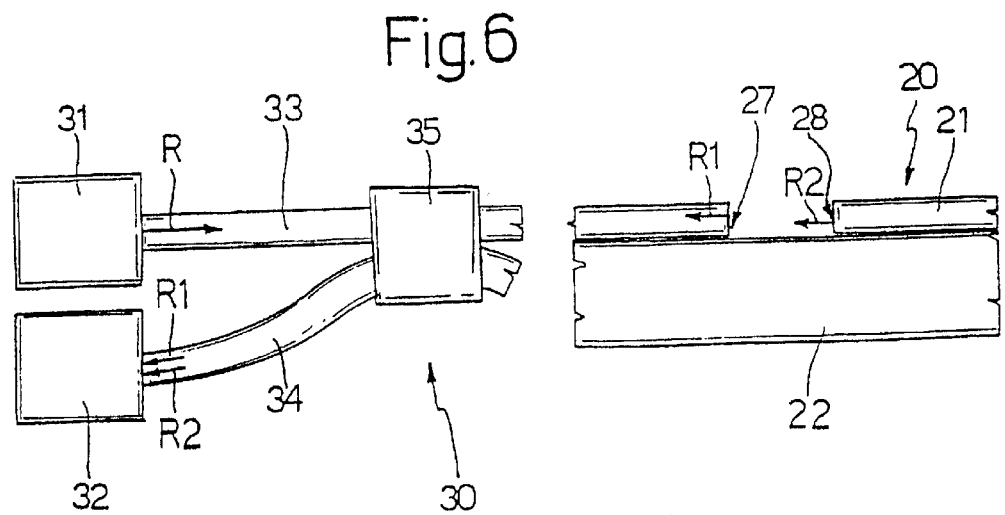

METHOD OF PRODUCING AN OPTICAL FIBRE RESONANT CAVITY, IN PARTICULAR FOR AN INTERFEROMETRIC SENSOR, AND OPTICAL FIBRE RESONANT CAVITY PRODUCED THEREBY

TECHNICAL FIELD

The present invention relates to a method of producing an optical element, in particular an interferometric sensor, and to the optical element produced thereby.

More specifically, the present invention relates to a method of producing an optical element which may be used to advantage in Fabry-Perot and Fizeau interferometric sensors, which provide for high resolution temperature, density, pressure, mechanical stress, mechanical vibration, acoustic wave and magnetic field measurements, as well as for measuring the properties, e.g. thermal, electric, magnetic, chemical, mechanical, etc., of materials.

BACKGROUND ART

As is known, in addition to a light source and a photodetector, Fabry-Perot interferometers also comprise a transparent cavity defined by two flat parallel reflecting surfaces (at least one of which is only partially reflecting to allow the light to travel out of the cavity) and in turn defining a resonating cavity for the light emitted by the light source.

Fabry-Perot interferometers are produced in various configurations according to the type of measurement being made.

In one known configuration, the ends of a first and second optical fiber of the same type are placed facing each other to define an optical resonating cavity between the two ends. U.S. Pat. No. 5,392,117 describes an optical element for an interferometric sensor.

For the interferometer to function correctly, the ends of the two fibers must be aligned extremely accurately, must be spaced accurately to define a cavity of predetermined length, and must be locked in this position to define a stable cavity subject to no time-or temperature-induced variation in size (other than that produced deliberately for effecting the measurement). For this purpose, various solutions have been proposed.

In one known technique, the ends of the two fibers are inserted inside opposite ends of a capillary tube of an inside diameter slightly larger than the outside diameter of the fibers, and are positioned facing each other at a distance equal to the required length of the cavity. While ensuring accurate alignment of the fibers, the above technique is difficult to implement on account of the small tolerances involved. Moreover, while enabling the two fibers to be spaced according to the size of the cavity, the connection between the capillary tube and the fibers is weak, and may result in instability of the cavity due to undesired axial movement of the fibers during the measurement.

A further known technique employs a similar capillary tube inside which the end of one of the two fibers is fused; and the end of the second fiber is inserted inside the other end of the tube, is spaced as required with respect to the first fiber, and is then bonded to the tube using an epoxy resin. In this case, however, difficulty is encountered in aligning the second fiber with the first; eventual degradation and the sensitivity to high temperature of the epoxy resin eventually impair the stability of the connection; and the process as a whole is more complex than the first.

In yet a further known technique, a capillary tube of the same outside diameter as the fibers and of a length equal to the required length of the cavity is interposed between the facing ends of the two fibers; and the end edges of the capillary tube are fused with those of the adjacent fibers to form a cavity which is inaccessible from the outside. The disadvantage of this technique lies in the aligning precision involved.

Moreover, all the above techniques result in a closed cavity, thus preventing metalization of the ends of the fibers (to vary the response characteristics of the interferometer) and the insertion inside the cavity of optical elements or substances required for performing certain types of measurement.

DISCLOSURE OF INVENTION

It is an object of the present invention to provide a method of stably connecting the ends of two fibers defining a resonating cavity of an interferometer, and designed to overcome the aforementioned drawbacks.

According to the present invention, there is provided a method of producing an optical element, in particular an interferometer sensor, as claimed in claim 1.

The present invention also relates to an optical element produced using the above method.

According to the present invention, there is provided an optical element as claimed in claim 14.

BRIEF DESCRIPTION OF THE DRAWINGS

A preferred, non-limiting embodiment of the present invention will be described by way of example with reference to the accompanying drawings, in which:

FIG. 4 shows, schematically and with parts removed for clarity, a variation of the FIG. 3 step;

FIG. 5 shows the finished optical element according to the invention;

FIG. 6 shows, schematically, a Fabry-Perot optical interferometer featuring the optical element according to the invention.

BEST MODE FOR CARRYING OUT THE INVENTION

The method according to the present invention provides for producing an optical element, which may be used to advantage as the main component of an optical, in particular a Fabry-Perot, interferometer.

Figure 1:
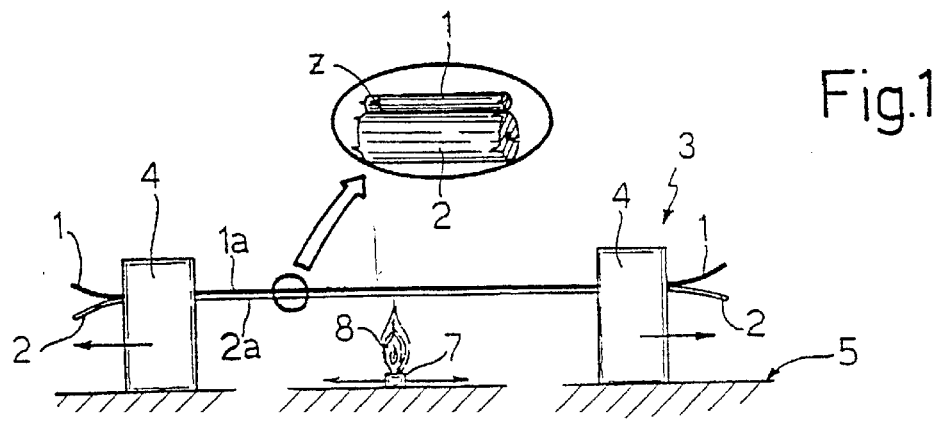
FIG. 1 shows, schematically, a first step in the method according to the present invention.

As shown in FIG. 1, the optical element of the present invention is produced from a first-optical fiber 1 made of glass (e.g. a single-mode fiber with an outside diameter of 125 $\mu$m) for conveying light to a Fabry-Perot interferometer, and from a second optical fiber 2 also made of glass, larger in diameter than the first, and for simply defining a structural support for first fiber 1.

The method initially comprises the step of securing both fibers 1 and 2 to a known supporting and traction device 3 for positioning fibers 1 and 2 parallel and contacting each other along a straight portion of predetermined length. More specifically, fibers 1 and 2 are so positioned contacting each other that the circular cross sections of the fibers are tangent to each other along a contact portion Z.

Supporting and traction device 3 comprises two known carriages 4 (shown schematically) mounted on a horizontal surface 5, and which slide in controlled manner to and from each other along surface 5; and fibers 1 and 2 are secured in known manner (not shown) to carriages 4 so that respective adjacent portions 1a and 2a extend in straight parallel directions between carriages 4.

A butane gas burner 7 for emitting a flame 8 is set up and moved in controlled manner between carriages 4 to heat adjacent portions 1a and 2a with flame 8 to a predetermined temperature, and so fuse the surfaces of portions 1a and 2a along contact portion Z. The above heat treatment is controlled as to duration, the temperature of flame 8 and the travel of burner 7; portions 1a and 2a are fused only superficially to prevent significantly altering the core, and hence the light transmitting properties, of fiber 1; and, following heat treatment, fibers 1 and 2 are secured stably to each other along contact portion Z.

Figure 2:
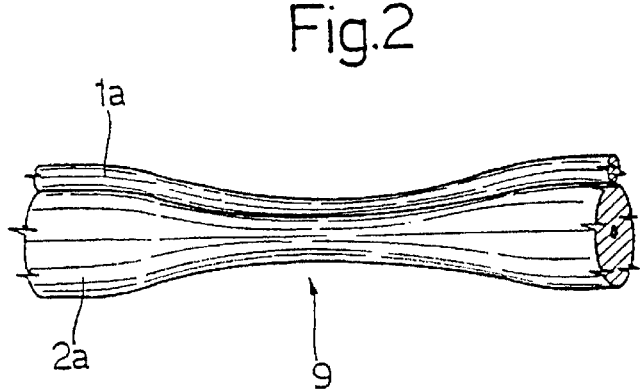
FIG. 2 shows part of the optical element according to the invention at the end of an intermediate step in the method according to the invention.

Simultaneously with the fusion process, portions 1a and 2a may, also be subjected to a tapering process, which comprises moving carriages 4 away from each other to exert controlled traction on portions 1a and 2a as they are being heated, and so stretch portions 1a and 2a axially to form a small-cross-section central portion 9 (FIG. 2). The tapering process provides for varying both the mechanical and light conducting characteristics of fiber 1, as described later on.

Following the fusion and tapering (if any) of fibers 1 and 2, an optically transparent cavity defining an optical resonating cavity is formed along portion 1a using one of the two techniques described below.

Figure 3:
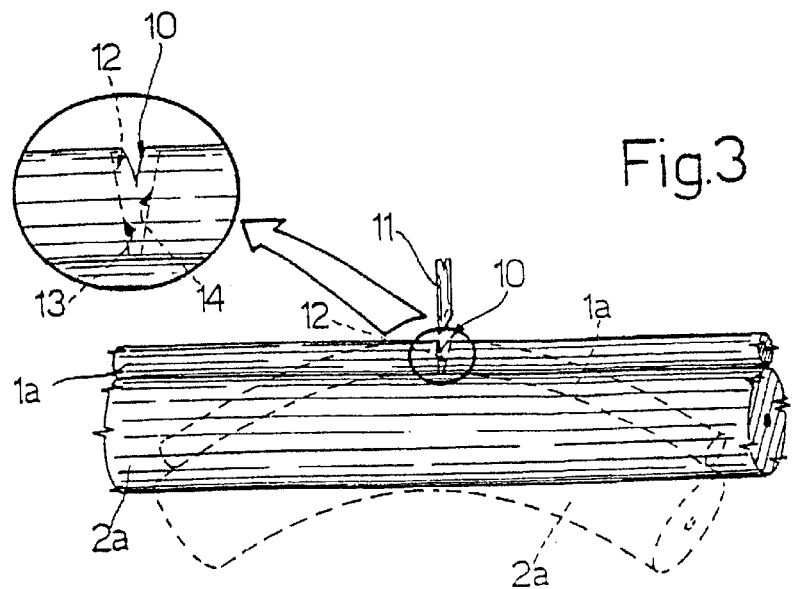
FIG. 3 shows, schematically and with parts removed for clarity, a further step in the method according to the invention.

In a first technique shown in FIG. 3, a surface incision 10 is made in portion 1a with a cleaving tool 11 to weaken fiber 1 at the incision; and portions 1a and 2a are bent about the incision, as shown by the dotted line, to deform fibers 1 and 2, break fiber 1 only at incision 10, and so form a very small cavity 12 (approximately one micron width, and as shown by the dotted line and more clearly in the enlarged detail) defined by two flat, less than perfectly parallel surfaces 13 and 14 (forming an angle of a fraction of a degree). The size of cavity 12 may be regulated within a narrow range by increasing or decreasing the extent to which fibers 1 and 2 are bent, and may be stabilized by an annealing process wherein portions 1a and 2a are heated by flame 8 to below the fusion temperature to stabilize the mutual positions of flat surfaces 13 and 14, which are also substantially perpendicular to the axis of portion 1a of fiber 1.

In a second technique shown in FIG. 4, the cavity is formed in portion 1a using a circular saw 16 (shown only partially) with a flat rotary blade 17 of constant thickness. Blade 17 is positioned with its axis parallel to the axes of fibers 1 and 2, and is moved towards fiber 1 in such a manner as to ensure it is maintained perpendicular to the axis of fiber 1, to cut portion 1a transversely and so form a cavity 18 of the same size as the thickness of blade 17 and defined by two flat parallel surfaces (not shown) facing each other and perpendicular to the axis of portion 1a.

According to a variation not shown, larger cavities may be formed, using either one of the above techniques, by forming in portion 1a two interruptions (breaks or cuts, depending on the technique used) separated by a predetermined distance, and by removing the portion of optical fiber between the two interruptions.

At the end of the above processes, portions 1a and 2a are cut (in a manner not shown) to obtain an optical element 20 as shown in FIG. 5, and which comprises a first optical fiber portion 21 defined by a portion off portion 1a of predetermined length (e.g. several centimeters), and a second optical fiber portion 22 defined by a portion of portion 2a of predetermined length, but shorter than and supporting first portion 21 (e.g. about a centimeter). First portion 21 comprises a cavity 26 formed using one of the above techniques, and two end portions 24, 25, the first being longer than the second to allow for connections; cavity 26 is defined by facing flat surfaces 27 and 28 substantially parallel to each other and perpendicular to the axis of first portion 21; and surfaces 27, 28 may be given a semireflecting metal coating 29 to vary the response characteristics of optical element 20.

As shown in FIG. 6, optical element 20 may be used to form a known Fabry-Perot optical interferometer 30, which is there fore only described briefly. Interferometer 30 comprises a light source 31 (e.g. a laser diode); a photodetector 32; an optical element 20 as described above; an optical fiber 33 connecting optical element 20 to source 31 (in a manner not shown); and a further optical fiber 34 connected to optical fiber 33 by an optical coupler 35 to define an optical path between element 20 and photodetector 32.

Interferometer 30 operates as follows. Source 31 generates a light beam R, which is conveyed to element 20 by optical fiber 33; beam R enters optical fiber portion 21 and impinges on surface 27 by which it is partly reflected (beam R1) and partly transmitted to define a transmitted beam (not shown) through cavity 26; and the transmitted beam is in turn partly transmitted and partly reflected by surface 28 to define a reflected beam R2, which travels partly back through surface 27 and out of optical element 20 to photodetector 32 together with beam R1. Together with beams R1 and R2, photodetector 32 also receives further beams (not shown) defined by fractions of beam R subjected to multiple reflection between surfaces 27 and 28. Conversely, other fractions of beam R are transmitted beyond surface 28 and dispersed.

Photodetector 32 therefore detects any interference between beams R1 and R2. Whereas the phase of beam R1 is constant, the phase of beam R2 is affected by any variation in the length of cavity 26 (due, for example, to thermal expansion or mechanical vibration), and by any change in the index of refraction in cavity 26 (due, for example, to the interposition of an optical element with an index of refraction other than that of air), so that the quantity being measured may be determined by measuring the interference of beams R1 and R2.

Besides being used as an interferometer, optical element 20 may also be used as a light modulator by varying the size of cavity 26 in response to a modulating input signal, and so varying the properties of the light traveling through it.

By metalizing surfaces 27 and 28, both the dynamic response range and the rate of change in light intensity may be regulated as a function of the size of cavity 26; while tapering fiber portions 1a and 2a provides for improving mechanical response to stress of optical element 20 and reducing losses in cavity 26. Which reduction in loss is due, in particular, to narrowing the core of the fiber, which provides for widening the spot of beam R, and so reducing divergence of the fraction of beam R transmitted into cavity 26, and increasing the percentage of light recaptured by fiber 21 and transmitted to photodetector 32. Similarly, for a given quantity of light recaptured by fiber 21, longer cavities may be formed and manufacturing tolerances may be reduced.

The advantages of the device and method according to the invention are as follows.

Optical element 20, which, as stated, defines the sensitive element of interferometer 30, is mechanically stable by virtue of featuring a support 2 for optical fiber 1. Being performed after the fusion process, the cavity forming process is particularly straightforward, and provides for minimizing manufacturing errors and tolerances, and so also eliminating the transverse and angular alignment problems of techniques requiring the alignment of two optical fibers to form the cavity. Optical element 20 may also be isolated by enclosing it in a sealed container and filling the container with inert gas. Alternatively, the cavity 26 may be filled with a stabilising material.

Optical element 20 is easy to produce by comprising only a small number of low-tolerance components; and the tuning, calibration and quality control processes during the formation of the cavity are simplified.

The manufacturing processes of element 20 may easily be modified to adapt the optical and mechanical properties of element 20 to the requirements of different applications.

Optical element 20 is strong and cheap to produce, may be miniaturized as required, is compatible with all standard optoelectronic components, and may also be used to advantage in other types of fully optical devices.

The response characteristics of optical element 20, such as dynamic range and sensitivity, may easily be modified during manufacture by depositing metal coating 29 on surfaces 27 and 28.

And finally, even the finished optical element 20 may be reconfigured to a small extent by further heat treatment.

Clearly, changes may be made to the method and optical element as described and illustrated herein without, however, departing from the scope of the present invention.

In particular, optical fiber 1 may be single-mode—which is preferable in the case of a coherent light source—or multi-mode—which is preferable in the case of a noncoherent light source; and the substrate may comprise an element other than an optical fiber, may have other than a circular section, and may be appropriately doped or coated to improve the sensitivity of optical element 20.

Optical fiber 2 may be substituted by a support element of different form, made of glass.

Moreover, as opposed to the flame technique described, optical fiber 1 may be surface fused to the substrate using an electric arc or laser beam.

Bragg gratings may be inserted in known manner into the finished optical element 20 to improve its sensitivity, or for multipling different wavelengths in the case of optical devices comprising a number of optical elements of the type described.

The same techniques described may be used to form more complex optical elements, e.g. Mach Zehnder interferometers with the optical fiber parts fused to the substrate.

Moreover, the same techniques described may be used to form a number of cavities in series for performing simultaneous measurements using time, wavelength or other multipling techniques. Again forming two or more cavities, a passive quadrature phase shifted demodulation system may be formed by simultaneously regulating the size of the cavities to achieve the quadrature condition by bending and heating (annealing) the optical fiber and substrate.

What is claimed is:

1. A method of producing an optical element, in particular an interferometric sensor, from an optical fiber (1) and a supporting element (2), characterized by comprising the steps of:

placing at least a portion (1a) of said optical fiber (1) in contact with a portion (2a) of said supporting element (2);

forming a stable connection between said portion of said optical fiber and said portion of said supporting element by fusing the surfaces of said portion of said optical fiber and of said portion of said supporting element along a contact portion; and;

forming at least one cavity (12,18,26) in said portion of said optical fiber; said cavity being defined by facing surfaces (13,14,27,28) of said optical fiber, and defining an optical resonating cavity.

2. A method as claimed in claim 1, characterized in that said step of forming a cavity comprises the steps of making a surface incision (10) in and to weaken said portion of said optical fiber; and bending said optical fiber and said supporting element to break said optical fiber transversely at said incision.

3. A method as claimed in claim 1, characterized in that said step of forming a cavity comprises the steps of making two surface incisions in said portion of said optical fiber; bending said optical fiber and said supporting element to break said optical fiber transversely at said incisions; and removing the optical fiber portion between said incisions.

4. A method as claimed in claim 1, characterized in that said step of forming a cavity comprises the step of making a transverse cut in said portion of said optical fiber.

5. A method as claimed in claim 1, characterized in that said step of forming a cavity comprises the step of making two transverse cuts in said portion of said optical fiber; and removing the optical fiber portion between said transverse cuts.

6. A method as claimed in claim 1, characterized by comprising the further step of subjecting said optical fiber and said supporting element to traction during the fusion of said portion of said optical fiber and said portion of said supporting element, to form a small-cross-section central portion (9) of said portion of said optical fiber and said portion of said supporting element.

7. A method as claimed in claim 1, characterized in that said supporting element comprises a cylindrical element larger in diameter than said optical fiber.

8. A method as claimed in claim 1, characterized in that said supporting element comprises a further optical fiber.

9. A method as claimed in claim 1, characterized by also comprising the step of forming an at least partly reflecting coating (29) on said facing surfaces.

10. A method as claimed in claim 1, characterized by comprising the step of subjecting said portions (1a,2a) of said optical fiber (1) and said supporting element (2) to a thermal annealing process to permanently define the dimensions of said cavity.

11. A method as claimed in claim 1, characterized in that said step of surface fusing said portion of said optical fiber and said portion of said supporting element is performed using a flame, or a laser beam, or an electric arc.

12. A method as claimed in claim 1, characterized by comprising the step of cutting said portions of said optical fiber and said supporting element to obtain an optical element (20) comprising an optical fiber portion (21) having said optical resonating cavity (12,18,26), and a supporting element portion (22) connected permanently to said optical fiber portion.

13. An optical element for an interferometric sensor, characterized by comprising an optical fiber portion (21) fixed stably to a supporting element (22) through a contact portion where the surfaces of said optical fiber portion and said supporting element are fused together, and defining an optical resonating cavity (26) defined by facing surfaces (27,28) of said optical fiber portion substantially crosswise to the axis of the optical fiber portion (21), characterized by the fact that said optical fiber portion (21) contacts said supporting element (22) along a contact portion (2); the cross sections of said optical fiber portion (21) and said supporting element (22) being tangent to each other along said contact portion (2).

14. An optical element as claimed in claim 13, characterized in that said supporting element (22) comprises a cylindrical element (22) larger in diameter than said optical fiber portion (21), characterized by the fact that said optical fiber portion (21) contacts said supporting element (22) along a contact portion (2); the cross sections of said optical fiber portion (21) and said supporting element (22) being tangent to each other along said contact portion (2).

15. An optical element as claimed in claim 13, characterized in that said supporting element (22) is shorter than said optical fiber portion (21).

16. An optical element as claimed in claim 13, characterized in that said facing surfaces (27,28) comprise an at least partly reflecting coating.

17. An optical element as claimed in claim 13, characterized in that said optical fiber portion (21) comprises a reduced cross-section central portion (9) extending at said cavity (26).

18. An optical element as claimed in claim 13, characterized in that said optical resonating cavity (26) is filled with a stabilizing material.

* * * * *